United States Patent
Maruishi

(10) Patent No.: US 9,941,649 B2
(45) Date of Patent: Apr. 10, 2018

(54) INTERBOARD CONNECTION CONNECTOR WITH BATTERY CONNECTOR

(71) Applicant: DDK Ltd., Tokyo (JP)

(72) Inventor: Masatoshi Maruishi, Tokyo (JP)

(73) Assignee: DDK LTD., Tokyo (JP)

( * ) Notice: Subject to any disclaimer, the term of this patent is extended or adjusted under 35 U.S.C. 154(b) by 0 days.

(21) Appl. No.: 15/537,789

(22) PCT Filed: Dec. 14, 2015

(86) PCT No.: PCT/JP2015/084889
§ 371 (c)(1),
(2) Date: Jun. 19, 2017

(87) PCT Pub. No.: WO2016/098715
PCT Pub. Date: Jun. 23, 2016

(65) Prior Publication Data
US 2017/0352997 A1    Dec. 7, 2017

(30) Foreign Application Priority Data
Dec. 18, 2014    (JP) ................................. 2014-255661

(51) Int. Cl.
*H01R 24/00*    (2011.01)
*H01R 27/02*    (2006.01)
(Continued)

(52) U.S. Cl.
CPC ......... *H01R 27/02* (2013.01); *H01R 12/7076* (2013.01); *H01R 12/732* (2013.01);
(Continued)

(58) Field of Classification Search
CPC .. H01R 12/72; H01R 12/7005; H01R 13/629; H01R 12/51; H01R 11/281; H01R 12/73;
(Continued)

(56) References Cited

U.S. PATENT DOCUMENTS 4,946,403 A * 8/1990 Billman ................ H01R 12/83
439/326
5,697,802 A * 12/1997 Kawabe ................ H01R 12/83
439/326
(Continued)

FOREIGN PATENT DOCUMENTS

EP    2224541 A1    9/2010
JP    H07-114910 A    5/1995
(Continued)

OTHER PUBLICATIONS

English Translation of the Written Opinion of the International Search Authority for PCT/JP2015/084889, dated Mar. 1, 2016.
(Continued)

*Primary Examiner* — Abdullah Riyami
*Assistant Examiner* — Justin Kratt
(74) *Attorney, Agent, or Firm* — Procopio, Cory, Hargreaves & Savitch LLP

(57) ABSTRACT

A connector includes a plurality of contacts each including first and second contact pieces provided with first and second contact portions at distal end sides, respectively, that come into contact with conductor portions of two insertable/removable connection objects when the connection objects are inserted, and a connection portion to be connected and secured to a board. The connector further includes a housing that holds the contacts in an array and includes an insertion opening of a shape that allows insertion of the connection objects and a battery from a same direction, and a terminal is arranged in the housing and spaced apart from the contacts in a width direction of the housing, the terminal including third and fourth contact pieces provided with third and fourth contact portions on distal end sides, respectively, configured to come into contact with the conductor portion of one of the connection objects and the battery.

5 Claims, 8 Drawing Sheets

(51) Int. Cl.
*H01R 12/73* (2011.01)
*H01R 12/70* (2011.01)
*H01R 13/41* (2006.01)
*H01M 2/10* (2006.01)
*H01R 12/72* (2011.01)
*H01R 11/28* (2006.01)
*H01R 12/51* (2011.01)
*H01R 13/629* (2006.01)

(52) U.S. Cl.
CPC .......... *H01R 13/41* (2013.01); *H01M 2/1038* (2013.01); *H01M 2/1044* (2013.01); *H01R 11/281* (2013.01); *H01R 12/51* (2013.01); *H01R 12/7005* (2013.01); *H01R 12/72* (2013.01); *H01R 12/721* (2013.01); *H01R 12/73* (2013.01); *H01R 13/629* (2013.01); *Y10S 493/951* (2013.01)

(58) Field of Classification Search
CPC . H01R 12/732; H01R 12/721; H01M 2/1038; H01M 2/1044; Y10S 493/951
USPC .... 439/62, 64, 377, 500, 630, 631; 429/100, 429/96
See application file for complete search history.

(56) References Cited

U.S. PATENT DOCUMENTS 5,993,248 A * 11/1999 Bethurum .......... H01M 2/1044
  439/500
6,472,744 B1 * 10/2002 Sato ...................... H01L 25/105
  257/723
2007/0249232 A1   10/2007 Haneishi
2010/0221928 A1   9/2010 Sato et al.

FOREIGN PATENT DOCUMENTS

| | | |
|---|---|---|
| JP | H08-171966 A | 7/1996 |
| JP | 2007-287589 A | 11/2007 |
| JP | 2007-307211 A | 11/2007 |
| JP | 2010-198996 A | 9/2010 |

OTHER PUBLICATIONS

English Translation of International Preliminary Report on Patentability Chapter I for PCT/JP2015/084889, dated Jun. 20, 2017.
International Search Report and Written Opinion for PCT App No. PCT/JP2015/084889 dated Mar. 1, 2016, 6 pgs.

* cited by examiner

INTERBOARD CONNECTION CONNECTOR WITH BATTERY CONNECTOR

CROSS-REFERENCE TO RELATED APPLICATIONS

This is the National Stage of International Application No. PCT/JP2015/084889, filed Dec. 14, 2015, which claims the benefit of Japanese Patent Application No. 2014-255661, filed Dec. 18, 2014, the disclosure of which are hereby incorporated by reference in their entirety.

TECHNICAL FIELD

The present disclosure relates to a connector for use in electrical equipment and electronic equipment or the like, and particularly relates to a connector that connects two connection objects (for example, boards) and also connects with a battery with a simple and low-cost structure, providing excellent workability and stable contact (connection) reliability.

BACKGROUND ART

There are generally two types of connectors for connecting two boards: a so-called inter-board connection connector of a type in which a connector is mounted on each board and the connectors are interconnected (mated); and a so-called card edge connector of a type in which a connector is mounted on one board and the other board (card) is inserted into (mated with) the connector.

The inter-board connection connector generally includes a plurality of contacts made of a conductive material, the plurality of contacts including contact portions that contact a counterpart connector and a connection portion to be mounted on the board, and a housing made of an insulating material in which the plurality of contacts are held and arrayed. Both connectors are configured such that housings of the both connectors mate with each other and the contacts of the both connectors are allowed to contact each other. The connectors may be further provided with a fixture as required in order to increase a holding strength to the board. Patent Document 1 already proposed by the present applicant is an example of publicly known documents which disclose such an inter-board connection connector provided with a fixture.

The card edge connector generally includes at least a plurality of contacts made of a conductive material, the plurality of contacts including contact portions that contact a board (card), and a housing made of an insulating material in which the plurality of contacts are held and arrayed. The housing is provided with an insertion opening into which the card is inserted. The housing may also be provided with a guide mechanism (extending portion) for guiding the card into the insertion opening as required and locking means for locking the card at both ends in a longitudinal pitch direction. Patent Document 2 already proposed by the present applicant is an example of publicly known documents which disclose a card edge connector having such a configuration.

When placing a battery on a board and connecting the battery to the board, normally, a battery connection terminal provided with a mechanism for pressing the battery is arranged on one of the above two boards, and the battery and the board are connected by press-contacting the terminal to the battery. For example, a casing or the like for accommodating a battery is arranged on the board, and by inserting the battery between the casing and the terminal of the board, the terminal press-contacts to the battery, to thereby connect the battery to the board.

DOCUMENT LIST

Patent Documents

Patent Document 1: Japanese Laid-Open Patent Publication No. 2010-198996
Patent Document 2: Japanese Laid-Open Patent Publication No. 2007-287589

SUMMARY OF INVENTION

Technical Problem

However, in recent years, rather than an inter-board connection connector or a card edge connector having conventional structure, there has been a customer need for development of a new connector for connecting two boards with a simple and low-cost structure capable of connecting the two connection objects, also having a structure that allows a battery to be connected, having a structure that enables high density implementation and further having a structure that allows the two boards to be connected together by a work in the same direction (the insertion direction is to be made the same) to improve workability.

The present disclosure has been implemented in view of such conventional problems and it is an object of the present disclosure to provide a connector having a simple and low-cost structure, not only connecting two connection objects (for example, boards) but also connecting to a battery, and having excellent workability and stable contact (connection) reliability.

Solution to Problem

In order to attain the above described object, the configuration of essential parts of the present disclosure is as follows.

(1) A connector including a plurality of contacts including first and second contact pieces provided with first and second contact portions at distal end sides, respectively, and a connection portion to be connected and secured to a board, the first and second contact portions to come into contact with conductor portions of two insertable/removable connection objects in a state where the two connection objects are inserted, a housing that holds the plurality of contacts in an array state and includes insertion openings having a shape that allows insertion of the two connection objects and a battery from a same direction, and a terminal arranged at a position that is in the housing and spaced apart from the plurality of contacts in a width direction of the housing, the terminal including third and fourth contact pieces provided with third and fourth contact portions on distal end sides, respectively, the third and fourth contact portions to come into contact with the conductor portion of one of the two connection objects and the battery.

(2) The connector according to (1) above, wherein the two connection objects are a first connection object to be inserted at a battery side and a second connection object inserted at a side of the first connection object opposite to the battery, and the first contact portion of the first contact piece that comes into contact with the conductor portion formed on a surface of the first connection object on the battery side and the second contact portion of the second contact piece that comes into contact with the conductor portion formed on a surface of the second connection object opposite to the first connection object side.

(3) The connector according to (2) above, wherein the terminal is substantially U-shaped, and the third contact portion of the third contact piece that comes into contact with the battery, and the fourth contact portion of the fourth contact piece that comes into contact with the conductor portion formed on a surface of the first connection object on the second connection object side.

(4) The connector according to (2) or (3) above, wherein a space is provided between the housing and at least one of surfaces of two surfaces of the first connection object that is inserted, the space being capable of accommodating another component mounted on the at least one of the surfaces of the first connection object.

(5) The connector according to any one of (1) to (4) above, wherein the contacts are held by being press-fitted into the housing, and the press-fitting direction of the contacts with respect to the housing is perpendicular to the insertion direction of the connection object.

Effects of Invention

According to the connector of the present disclosure, two connection objects are connected and the connector is also connected to the battery with a simple and low-cost structure, and the two connection objects and the battery can be inserted from the same direction, it is thereby possible to improve workability and provide stable contact (connection) reliability. With the structure described in (5) above, the contact is prevented from coming off upon insertion of the connection object.

DESCRIPTION OF THE EMBODIMENTS

Figure 1A:
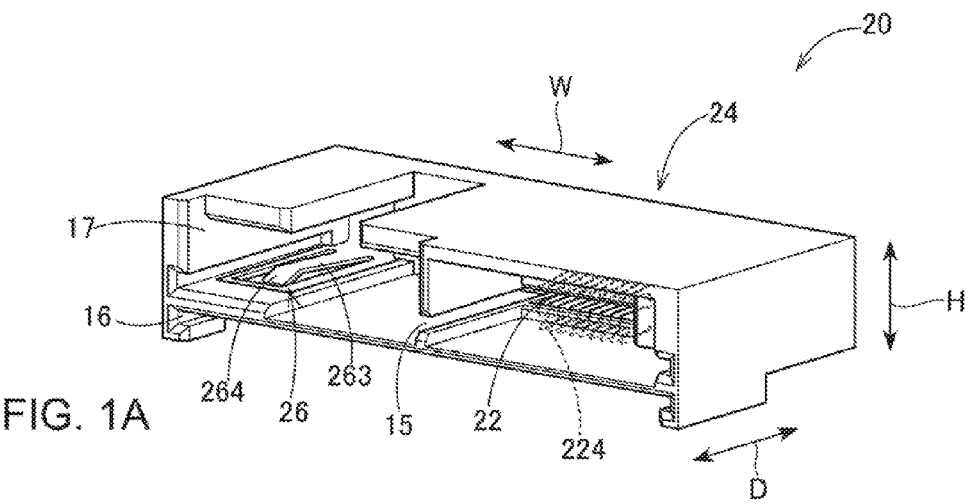
FIG. 1A is a perspective view of a connector of the present disclosure seen from an insertion opening side.

The present disclosure is a connector 20 provided with: a plurality of contacts 22 including first and second contact pieces 221 and 223 and a connection portion 226 to be connected and secured to a board (not shown), first and second contact pieces 221 and 223 being provided with first and second contact portions 222 and 224 at distal end sides, respectively, the first and second contact portions 222 and 224 to come into contact with conductor portions 301 and 321 of two insertable/removable connection objects 30 and 32 in a state where the two connection objects 30 and 32 are inserted; a housing 24 that holds the plurality of contacts 22 in an array state and includes an insertion opening having a shape that allows insertion of the two connection objects 30 and 32 and a battery 34 respectively from the same direction, the insertion opening in FIG. 1 including three insertion openings, i.e., a first insertion opening 15, a second insertion opening 16 and a third insertion opening 17; and a terminal 26 arranged at a position that is in the housing 24 and spaced apart from the plurality of contacts 22 in a width direction W of the housing 24, the terminal 26 including third and fourth contact pieces 261 and 263 provided with third and fourth contact portions 262 and 264 at distal end sides, respectively, the third and fourth contact portions 262 and 264 that come into contact with the conductor portion 301 or 321 of one connection object 30 or 32 of the two connection objects 30 and 32 and the battery 34.

That is, the connector 20 has a structure in which three insertion openings (first insertion opening 15, second insertion opening 16, and third insertion opening 17) allow the first connection object 30, the second connection object 32 and the battery 34 to be inserted in the same direction, that is, along a depth direction D of the housing 24 in FIG. 1 are provided in the housing 24, the contacts 22 held in the housing 24 come into contact with the inserted first and second connection objects 30 and 32, the terminal 26 held in the housing 24 is configured to come into contact with the battery 34 and the first or second connection object 30 or 32 to which the battery 34 is connected, and it is possible to connect the first and second connection objects 30 and 32 (for example, the first and second boards 30 and 32) and also to connect one of the first or second connection objects 30, 32 and the battery 34 in a simple and low-cost structure, and improving workability and providing stable contact (connection) reliability.

Figure 1B:
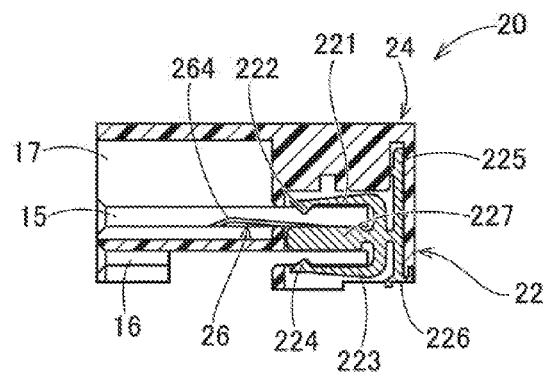
FIG. 1B is a cross-sectional view of the connector of the present disclosure cut at a position through a width center line of one contact.
Figure 1C:
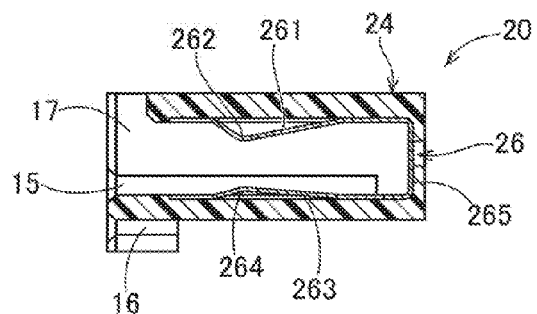
FIG. 1C is a cross-sectional view of the connector of the present disclosure cut at a position through a width center line of one terminal.
Figure 2A:
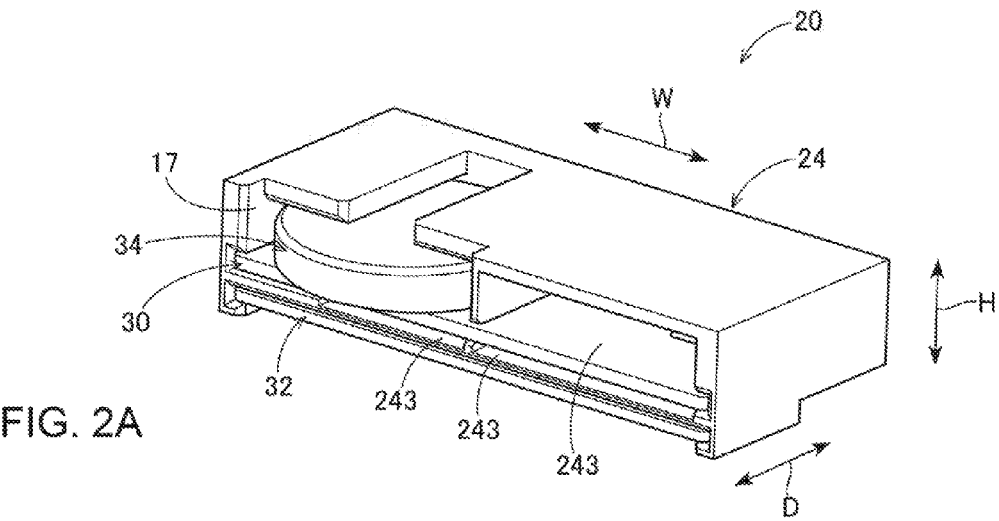
FIG. 2A is a perspective view of the connector of the present disclosure seen from the insertion opening side with two connection objects (first and second boards) and a battery being inserted.
Figure 2B:
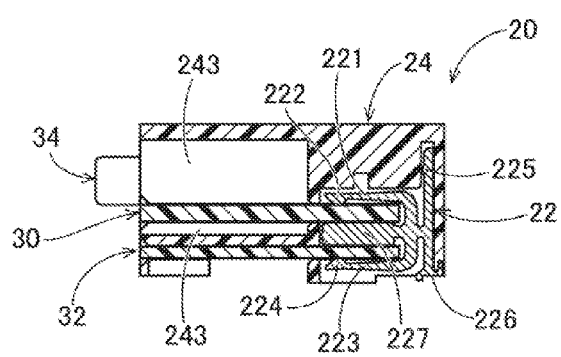
FIG. 2B is a cross-sectional view of the connector in FIG. 2A cut at a position through a width center line of one contact.
Figure 2C:
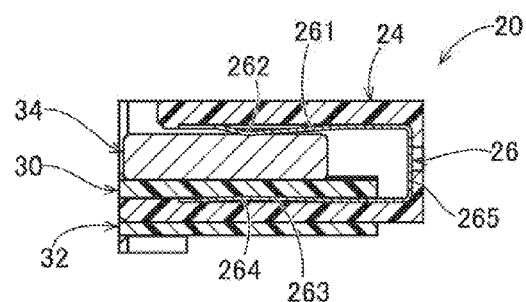
FIG. 2C is a cross-sectional view of the connector in FIG. 2A cut at a position through a width center line of one terminal. (The battery is shown not in a cross-sectional view but in an outline view.)
Figure 3A:
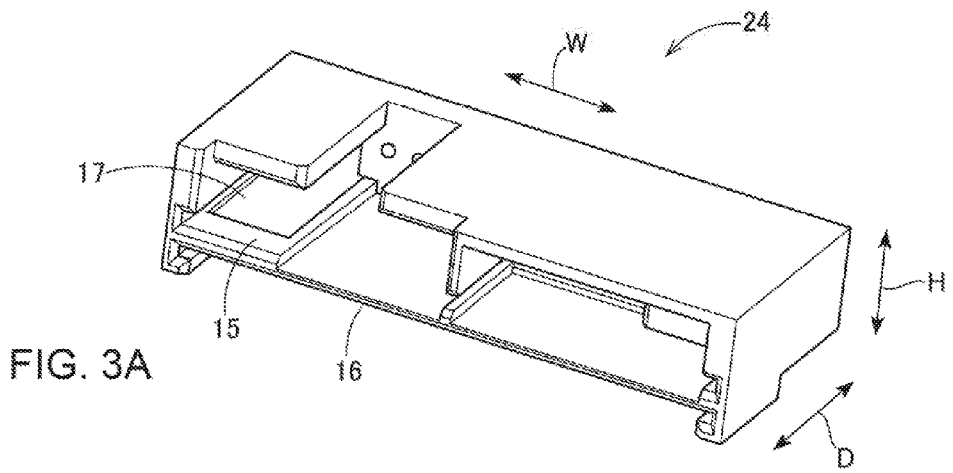
FIG. 3A is a perspective view of a housing seen from the insertion opening side.
Figure 3B:
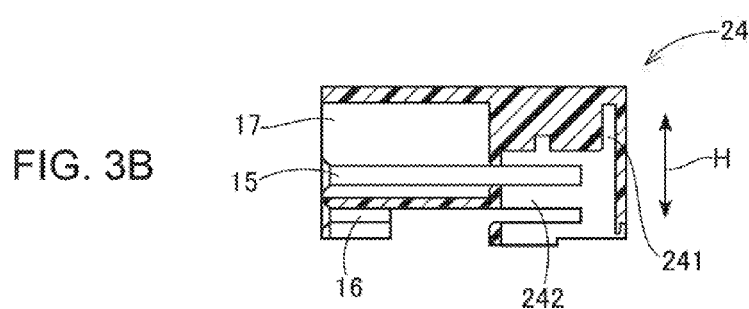
FIG. 3B is a cross-sectional view of the housing cut at a position of one contact insertion hole.
Figure 3C:
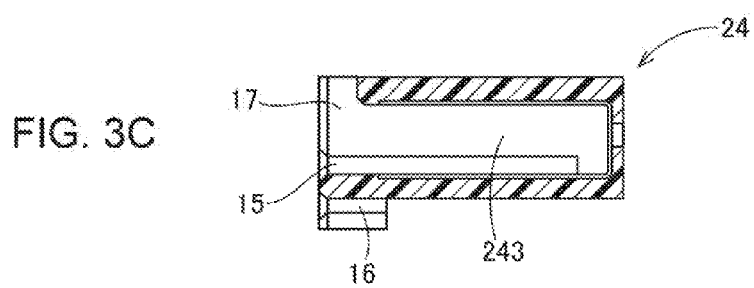
FIG. 3C is a cross-sectional view of the housing cut at a position of one terminal insertion hole.
Figure 4A:
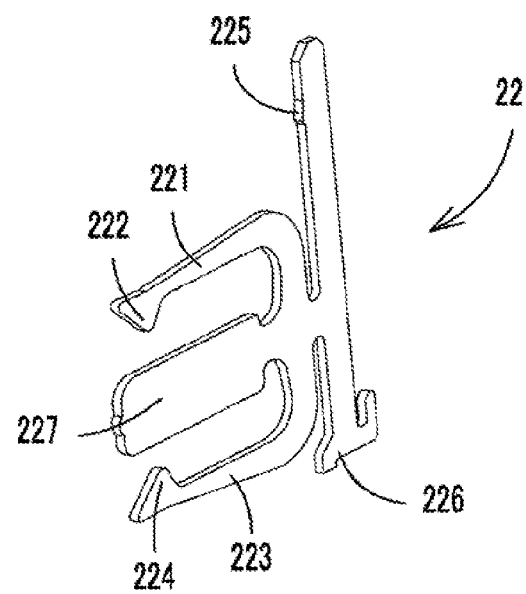
FIG. 4A is a perspective view of the contact seen from a first and second contact portion side.
Figure 4B:
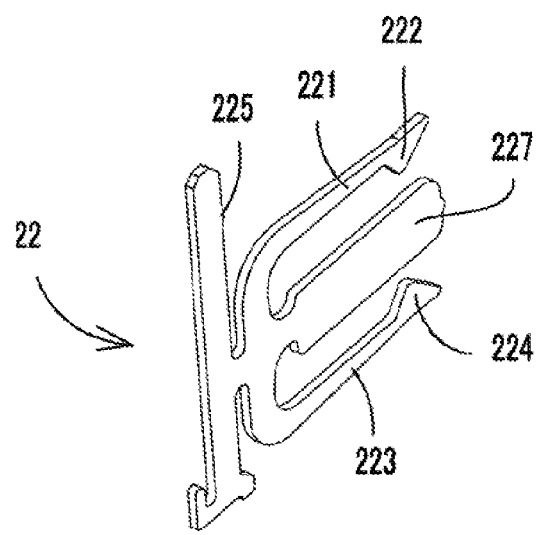
FIG. 4B is a perspective view of the contact seen from a side opposite to the first and second contact portion side.
Figure 5A:
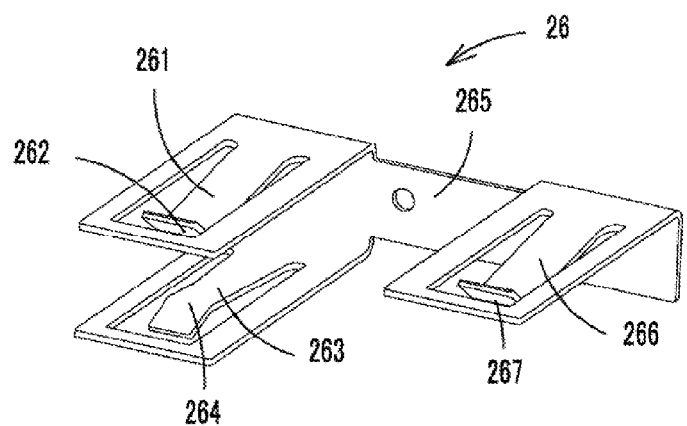
FIG. 5A is a perspective view of the terminal seen from a third and fourth contact portion side.
Figure 5B:
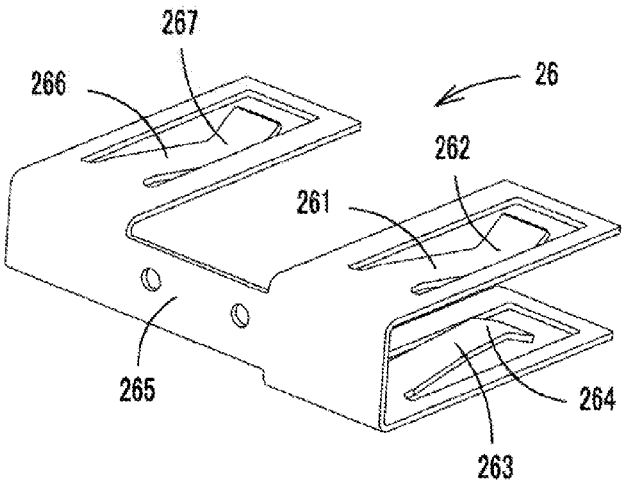
FIG. 5B is a perspective view of the terminal seen from a side opposite to the third and fourth contact portion side.
Figure 6A:
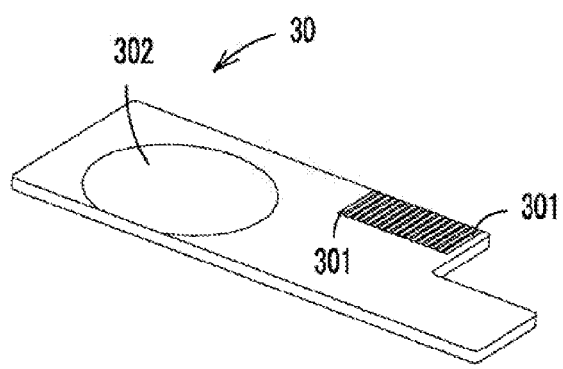
FIG. 6A is a perspective view of the first connection object (first board) seen from a surface (top surface) on the battery side.
Figure 6B:
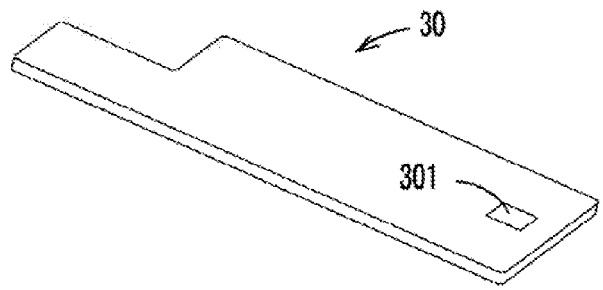
FIG. 6B is a perspective view of the first connection object (first board) seen from a surface (undersurface) opposite to the battery side.
Figure 7A:
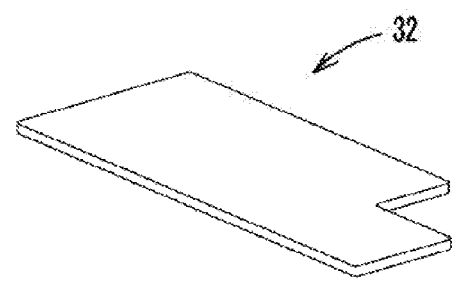
FIG. 7A is a perspective view of the second connection object (second board) seen from a surface (top surface) on the battery side.
Figure 7B:
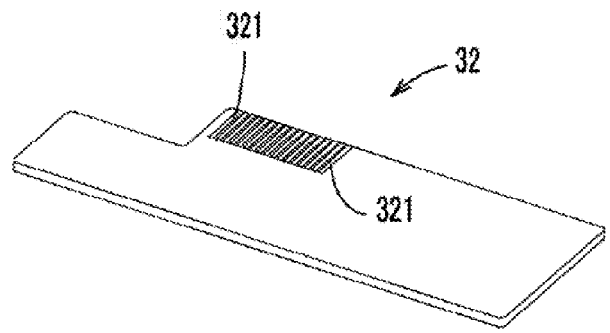
FIG. 7B is a perspective view of the second connection object (second board) seen from a surface (undersurface) opposite to the battery side.
Figure 8:
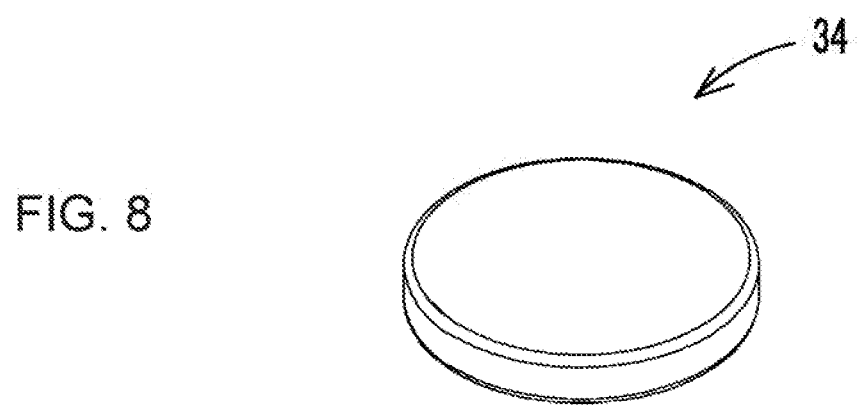
FIG. 8 is a perspective view of the battery.

An embodiment of a connector 10 of the present disclosure will be described based on FIG. 1A to FIG. 8. FIG. 1A is a perspective view of a connector of the present disclosure seen from an insertion opening side, FIG. 1B is a cross-sectional view of the connector of the present disclosure cut at a position through a width center line of one contact, FIG. 1C is a cross-sectional view of the connector of the present disclosure cut at a position through a width center line of one terminal, FIG. 2A is a perspective view of the connector of the present disclosure seen from the insertion opening side when two connection objects (first and second boards) and a battery are inserted, FIG. 2B is a cross-sectional view when the connector in FIG. 2A is cut at a position through a width center line of one contact, FIG. 2C is a cross-sectional view when the connector in FIG. 2A is cut at a position through a width center line of one terminal, FIG. 3A is a perspective view of the housing seen from the insertion opening side, FIG. 3B is a cross-sectional view of the housing cut at a position of one contact insertion hole, FIG. 3C is a cross-sectional view of the housing cut at a position of one terminal insertion hole, FIG. 4A is a perspective view of the contact seen from first and second contact portion sides, FIG. 4B is a perspective view of the contact seen from a side opposite to the first and second contact portion sides, FIG. 5A is a perspective view of the terminal seen from the third and fourth contact portion sides, FIG. 5B is a perspective view of the terminal seen from a side opposite to the third and fourth contact portion sides, FIG. 6A is a perspective view of the first connection object (first board) seen from a surface (top surface) on the battery side, FIG. 6B is a perspective view of the first connection object (first board) seen from a surface (undersurface) opposite to the battery side, FIG. 7A is a perspective view of the second connection object (second board) seen from a surface (top surface) on the battery side, FIG. 7B is a perspective view of the second connection object (second board) seen from a surface (undersurface) opposite to the battery side, and FIG. 8 is a perspective view of the battery.

Before describing the connector 20, the first and second connection objects 30 and 32 which are the two connection objects, and the battery 34 will be described. Examples of the first and second connection objects 30 and 32 include first and second boards 30 and 32 such as printed circuit boards, and examples of the first and second boards 30 and 32 can also include various cards (boards) such as rigid boards, flexible printed circuit boards (FPC) and memory cards. In the present embodiment, the first and second connection objects 30 and 32 are the first board 30 and the second board 32 which are rigid boards, and the first and second boards 30 and 32 are each provided with a land 301 or 321 which is a conductor portion on which the contact 22 of the connector 20 is mounted and a pattern which extends from the land 301 or 321 and is connected to electronic parts or the like. The first board 30 is further provided with a contact portion 302 which is a portion that comes into contact with the battery 34 and the land 301 which is a connection portion with the terminal 26. The battery 34 is intended to be brought into contact and conduction with the first board 30 and used as a power supply.

The connector 20 of the present disclosure will be described based on FIG. 1A to FIG. 5B. The connector 20 is mainly provided with a plurality of contacts 22, a housing 24 and a terminal 26. Furthermore, the connector 20 can also be provided with a fixture (not shown) to improve soldering strength in a case where the connector 20 is mounted on a board (not shown).

Next, the contact 22 will be described. The contact 22 is made of metal and can be manufactured using publicly known techniques such as press work or cutting. Examples of the material of the contact 22 include brass, beryllium copper or phosphor bronze since the contact 22 is required to have spring properties, conductivity, dimensional stability or the like. In the present embodiment, the contact 22 is held in the housing 24 by press-fitting, but the present disclosure only requires a configuration in which the contact 22 can be held or secured to the housing 24, and the contact 22 may also be held in the housing 24 by hooking (lance), welding or integral molding or the like.

The contact 22 includes at least first and second contact pieces 221 and 223 extending substantially in parallel at upper and lower positions in FIG. 11 and respectively provided with first and second contact portions 222 and 224 at the distal end sides, the first and second contact portions 222 and 224 to contact the lands 301 and 321 which are conductor portions of these first and second connection objects 30 and 32 in a state where the insertable/removable first and second connection objects 30 and 32 are inserted, and a connection portion 226 connected and secured to the board, and further includes a holding portion 225 extending in a substantially height direction H of the housing 24 to be secured to the housing 24, and a plate-like piece 227 extending in a substantially depth direction D of the housing 24.

The contact 22 is held in the housing 24 with the first contact piece 221 and the second contact piece 223 respectively extending in parallel at upper and lower positions toward the first and second insertion opening 15 and 16 sides of the housing 24. The first contact portion 222 and the second contact portion 224 are provided at distal ends of the first contact piece 221 and the second contact piece 223, respectively. The first contact portion 222 and the second contact portion 224 are portions of the contact 22 that contact the first board 30 and the second board 32, respectively, and have a convex shape to facilitate contact. Shapes and sizes of the first contact portion 222 and the second contact portion 224 can be determined as appropriate by taking shapes of the counterparts (first and second connection objects 30 and 32), contact stability, downsizing of the connector, strength or workability or the like into account. The embodiment shown in FIGS. 2A to 2C illustrates a configuration in which the first board 30, which is the first connection object, is inserted on the battery 34 side and the second board 32, which is the second connection object, is inserted at a side of the first board 30 opposite to the battery 34, with the first contact portion 222 of the first contact piece 221 of the contact 22 to come into contact with the land 301 formed on the surface (top surface) of the first board 30 on the battery 34 side and the second contact portion 224 of the second contact piece 223 to come into contact with the land 321 formed on the surface (undersurface) on a side opposite to the first board 30 side of the second board 32, but other configurations may also be employed.

The connection portion 226 of the contact 22 is a portion to be connected to a board (not shown). A method for connecting the connection portion 226 of the contact 22 to the board is not particularly limited, but may be soldering (surface mount or dip) or press-fitting. Note that the present embodiment shows a configuration in which a surface mounting type contact is used as the contact 22 and this contact is mounted by soldering. Note that a shape and size of the connection portion 226 of the contact 22 can be determined as appropriate by taking a mounting density, mounting strength, workability or the like into account.

The holding portion 225 of the contact 22 may have any configuration as long as it can be secured to the housing 24, and examples of the method for holding the contact 22 in the housing 24 include press-fitting, hooking (lance), welding or integral molding. In the present embodiment, the contact 22 is held and secured by being press-fitted into the housing 24, and a case where the direction in which the contact is press-fitted into the housing is perpendicular to the direction in which the connection object is inserted is shown. This configuration makes it less likely for the contact to come off from the housing 24 upon insertion of the connection object. In the present embodiment, the contact is provided with an arrowhead portion that protrudes toward one side in the width direction and press-fitted into the housing 24. A shape and size of the holding portion 225 are designed as appropriate by taking a holding force, workability, strength or the like into account.

The plate-like piece 227 protrudes in a direction substantially perpendicular to the holding portion 225 and toward the direction in which the insertion openings 15 to 17 are located, and to achieve stable connection between the contact 22 and the first and second boards 30 and 32 by sandwiching the first board 30 with the plate-like piece 227 and the first contact portion 222 of the contact 22 and sandwiching the second board 32 with the plate-like piece 227 and the second contact portion 224 of the contact. The plate-like piece 227 also fulfills a positioning-like role of the contact 22. A shape and size of the plate-like piece 227 are designed as appropriate by taking the above role, connection stability, strength, workability or the like into account.

Next, the housing 24 will be described. The housing 24 is made of electric insulating plastic and is manufactured using publicly known techniques such as injection molding or cutting, and its material is selected as appropriate by taking dimensional stability, workability, cost or the like into account, and general examples of the material include polybutylene terephthalate (PBT), polyamide (66PA, 46PA), liquid crystal polymer (LCP), polycarbonate (PC) or a synthetic material made from these materials. In the present embodiment, a case in which the housing 24 is manufactured using injection molding is shown.

The housing 24 has a substantially box shape. The housing 24 is provided with the first insertion opening 15, the second insertion opening 16 and the third insertion opening 17 which are three insertion openings into which the first board 30 and the second board 32 which are the two connection objects, and the battery 34 are inserted respectively. Shapes and sizes of the first insertion opening 15, the second insertion opening 16 and the third insertion opening 17 which are the three insertion openings may be such that the first board 30 and the second board 32 which are the two connection objects, and the battery 34 can be inserted, and are designed as appropriate by taking shapes, sizes, strength, workability or the like of the first board 30 and second board 32 which are the two connection objects and the battery 34 into account. According to the present embodiment, the first board 30 is inserted into the first insertion opening 15, the second board 32 is inserted into the second insertion opening 16 and the battery 34 is inserted into the third insertion opening 17. The first and second contact portions 222 and 224 of the contact 22 are configured to protrude in the first and second insertion openings 15 and 16, and according to the present embodiment, the first contact portion 222 of the contact 22 comes into contact with the land 301 which is a conductor portion formed on the surface (top surface) of the inserted first board 30 on the battery 34 side, and the second contact portion 224 of the contact 22 comes into contact with the land 321 which is a conductor portion formed on the surface (undersurface) opposite to the first board 30 side of the inserted second board 32. Regarding the structure of contact between the contact 22 and the first and second boards 30 and 32, although a case has been described in the present embodiment where the contact 22 comes into contact with the top surface of the first board 30 and the undersurface of the second board 32, it is also possible to employ a configuration in which the contact 22 comes into contact with the undersurface of the first board 30 and the undersurface of the second board 32, or a configuration in which the contact 22 comes into contact with the top surface of the first board 30 and the top surface of the second board 32, or a configuration in which the contact 22 comes into contact with the undersurface of the first board 30 and the top surface of the second board 32.

According to the present embodiment, the housing 24 is partitioned at the center position in the width direction (longitudinal pitch direction) W of the housing, and a first insertion hole 241 in which a plurality of the contacts 22 are held and arrayed is provided in one of half regions (half region located on the right in FIG. 1) in a direction perpendicular to the insertion direction of the first and second boards 30 and 32 (height direction H of the housing in FIG. 3B). The contact 22 is secured (held) in the first insertion hole 241 by press-fitting, hooking (lance), welding or integral molding or the like. According to the present embodiment, the contact 22 is secured by press-fitting. The first insertion hole 241 may have any shape and size as long as it can hold the contact 22, and the shape and size thereof may be determined as appropriate by taking a holding force, strength, workability, downsizing or the like into account.

A second insertion hole 242 into which the plate-like piece 227 of the contact 22 is to be inserted is provided in the housing 24 in a direction parallel to the direction in which the first and second boards 30 and 32 are inserted. The second insertion hole 242 fulfills a positioning-like role of the contact. A shape and size of the second insertion hole 242 only need to be a shape and size that allow the plate-like piece 227 of the contact 22 to be fitted therein, and are designed as appropriate by taking the above role, stable connectability, workability, strength or the like into account.

The housing 24 is provided with a space 243 between the housing and at least one of two surfaces of the inserted first board 30 (two surfaces of the inserted first board 30 in FIG. 2A) to allow another component mounted on at least one of the surfaces of the first board 30 (between the housing and the two surfaces of the inserted first board 30 in FIG. 2A) to be accommodated. The space 243 is formed in a space region other than the space region of the housing where the contact 22, the terminal 26 and the battery 34 are located as shown in FIGS. 2A to 2C. It is preferable to provide the space 243 in the housing 24 since another component can be mounted on at least one of the surfaces of the first board 30. A shape and size of the space 243 can be determined as appropriate by taking the size (downsizing) of the connector 20, mounting areas of the first board 30 and the second board 32, strength of the housing 24, workability and the size and shape of a part mounted or the like into account.

Next, the terminal 26 will be described. The terminal 26 is made of metal, and can be manufactured using publicly known techniques such as press work or cutting. Examples of the material of the terminal 26 include brass, beryllium copper, phosphor bronze or the like since the terminal 26 is required to have spring properties, conductivity, dimensional stability or the like. In the present embodiment, although a case where the terminal 26 is secured to the housing 24 by integral molding has been described, any method may be used as long as the terminal 26 can be secured, and examples of the method include press-fitting, hooking (lance) or welding.

The terminal 26 includes, on its distal end side, a third contact portion 262 and a fourth contact portion 264 which are contact portions that contact at least the battery 34 and a board connected to the battery 34 (first board 30 in the present embodiment), further includes a third contact piece 261 and a fourth contact piece 263 which are contact pieces protruding in parallel at upper and lower positions and a coupling portion 265 that couples the two contact pieces 261 and 263, and, in the present embodiment, further includes a pressing piece 266 including a pressing portion 267 that presses the battery 34.

The third contact piece 261, the fourth contact piece 263 and the pressing piece 266 of the terminal 26 in the present embodiment are formed by cutting and bending (or cutting and raising) so as to protrude toward the contacting part.

The third contact portion 262 is a portion to be in contact with the battery 34 and the fourth contact portion 264 is a portion to be in contact with the land 301 of the first board 30 to which the battery 34 is connected, and are curved so as to facilitate contact. Shapes and sizes of the third contact portion 262 and the fourth contact portion 264 can be determined as appropriate by taking shapes of the counterparts (first and second connection objects 30 and 32), contact stability, downsizing of the connector, strength or workability or the like into account. In the present embodiment, although a structure has been employed in which the third contact portion 262 contacts the top surface of the battery 34 and the fourth contact portion 264 contacts the undersurface of the first board 30, it is also possible to employ a structure in which the fourth connection portion 264 contacts the top surface of the first board 30 according to the specification or as required.

The pressing portion 267 of the terminal 26 is a portion that presses the battery 34 toward the first board 30 side and is curved so as to facilitate pressing. The pressing portion 267 presses the battery 34, to thereby ensure connection between the battery 34 and the first board 30. A shape and size of the pressing portion 267 can be determined as appropriate by taking the shape of the battery 34, contact stability, downsizing of the connector, strength, workability and the like into account.

INDUSTRIAL APPLICABILITY

According to the present disclosure, it is possible to provide a connector for use in electrical equipment or electronic equipment, having a simple and low-cost structure, capable of not only connecting two connection objects but also connecting a battery, and providing excellent workability and stable contact (connection) reliability.

LIST OF REFERENCE SIGNS 15 first insertion opening
16 second insertion opening
17 third insertion opening
20 connector
22 contact
221 first contact piece
222 first contact portion
223 second contact piece
224 second contact portion
225 holding portion
226 connection portion
227 plate-like piece
24 housing
241 first insertion hole
242 second insertion hole
243 space
26 terminal
261 third contact piece
262 third contact portion
263 fourth contact piece
264 fourth contact portion
265 coupling portion
266 pressing piece
267 pressing portion
30 first connection object or first board
301 conductor portion or land
302 contact
32 second connection object or second board
321 conductor portion or land
34 battery
W width direction (longitudinal pitch direction) of housing
D depth direction of housing
H height direction of housing

The invention claimed is:

1. A connector comprising:
   a plurality of contacts, each of the plurality of contacts including first and second contact pieces and a connection portion that is configured to be electrically connected and secured to a circuit board, the first and second contact pieces being provided with first and second contact portions at distal end sides, respectively, the first and second contact portions being configured to come into contact with conductor portions of two insertable/removable connection objects in a state where the two connection objects are inserted;
   a housing that holds the plurality of contacts in an array state and includes an insertion opening having a shape that allows insertion of the two connection objects and a battery from a same direction; and
   a terminal arranged at a position that is in the housing and spaced apart from the plurality of contacts in a width direction of the housing, the terminal including third and fourth contact pieces provided with third and fourth contact portions on distal end sides, respectively, the third and fourth contact portions being configured to come into contact with the conductor portion of one of the two connection objects and the battery.

2. The connector according to claim 1, wherein the two connection objects are a first connection object to be inserted at a battery side and a second connection object to be inserted at a side of the first connection object opposite to the battery, and
   the first contact portion of the first contact piece is configured to come into contact with the conductor portion formed on a surface of the first connection object on the battery side and the second contact portion of the second contact piece is configured to come into contact with the conductor portion formed on a surface of the second connection object opposite to the first connection object side.

3. The connector according to claim 2, wherein the terminal is substantially U-shaped, and the third contact portion of the third contact piece is configured to come into contact with the battery, and the fourth contact portion of the fourth contact piece is configured to come into contact with the conductor portion formed on a surface of the first connection object on the second connection object side.

4. The connector according to claim 2, wherein a space is provided between the housing and at least one of surfaces of two surfaces of the first connection object that is inserted, the space being capable of accommodating another component mounted on the at least one of the surfaces of the first connection object.

5. The connector according to claim 1, wherein the contacts are held by being press-fitted into the housing, and a press-fitting direction of the contacts with respect to the housing is perpendicular to an insertion direction of the connection object.

\* \* \* \* \*